United States Patent [19]

Newton

[11] 4,354,010

[45] Oct. 12, 1982

[54] TRANSITION METAL COMPOUND

[75] Inventor: Alan B. Newton, Welwyn Garden City, England

[73] Assignee: Imperial Chemical Industries Limited, London, England

[21] Appl. No.: 190,384

[22] Filed: Sep. 24, 1980

Related U.S. Application Data

[63] Continuation of Ser. No. 803,376, Jun. 3, 1977, abandoned, which is a continuation-in-part of Ser. No. 788,643, Apr. 18, 1977, abandoned, which is a continuation-in-part of Ser. No. 647,989, Jan. 9, 1976, abandoned.

[30] Foreign Application Priority Data

| Jan. 9, 1975 [GB] | United Kingdom | 920/75 |
| May 12, 1975 [GB] | United Kingdom | 19790/75 |
| Oct. 29, 1975 [GB] | United Kingdom | 44634/75 |
| May 7, 1976 [GB] | United Kingdom | 18786/76 |
| Jun. 21, 1976 [GB] | United Kingdom | 25638/76 |
| Jun. 21, 1976 [GB] | United Kingdom | 25639/76 |
| Jun. 21, 1976 [GB] | United Kingdom | 25640/76 |

[51] Int. Cl.³ .......................... C08F 4/64; C08F 10/00
[52] U.S. Cl. .................................. 526/140; 252/429 B; 526/122; 526/137; 526/138; 526/119; 526/351; 526/901; 526/906
[58] Field of Search .................... 252/429 B; 526/119, 526/122, 137, 138, 139, 140, 906

[56] References Cited

U.S. PATENT DOCUMENTS

| 3,026,311 | 3/1962 | Coover et al. | 526/140 |
| 3,317,499 | 5/1967 | Nakaguchi et al. | 526/140 |
| 3,318,858 | 5/1967 | Nakaguchi et al. | 526/140 |
| 3,328,366 | 6/1967 | Nakaguchi et al. | 526/140 |
| 3,534,006 | 10/1970 | Kamaishi et al. | 526/139 |
| 3,574,176 | 4/1971 | Boozer | 526/141 |
| 3,595,842 | 7/1971 | Schrage et al. | 526/142 |
| 3,639,375 | 2/1972 | Staiger et al. | 526/139 |
| 3,752,797 | 8/1973 | Gordon et al. | 526/139 |
| 3,764,591 | 10/1973 | Miyoshi et al. | 526/137 |
| 3,875,126 | 4/1975 | Tashiro et al. | 526/144 |
| 3,897,407 | 7/1975 | Shirai et al. | 526/142 |
| 3,972,866 | 8/1976 | Fortuin et al. | 526/139 |
| 3,977,997 | 8/1976 | Schick et al. | 526/139 |
| 3,990,994 | 11/1976 | Applegard et al. | 526/139 |
| 4,028,481 | 6/1977 | Shiomura et al. | 526/142 |
| 4,107,414 | 8/1978 | Giannini et al. | 526/125 |

FOREIGN PATENT DOCUMENTS

| 2230672 | 12/1972 | Fed. Rep. of Germany | 526/125 |
| 1374568 | 8/1964 | France. | |
| 39-24270 | 10/1964 | Japan | 526/119 |
| 933236 | 8/1963 | United Kingdom. | |
| 986463 | 3/1965 | United Kingdom. | |
| 1087314 | 10/1967 | United Kingdom. | |
| 1352718 | 5/1974 | United Kingdom | 526/125 |
| 1370559 | 10/1974 | United Kingdom. | |

OTHER PUBLICATIONS

Japanese Patent Specification No. 50-39377, pub. Apr. 11, 1975, partial translation only.
Polymer Science USSR, vol. 2, (1961) pp. 299–302.

*Primary Examiner*—Edward J. Smith
*Attorney, Agent, or Firm*—Cushman, Darby & Cushman

[57] ABSTRACT

A solid transition metal compound is ground with an organo-sulphur compound which is a defined aromatic sulphone, sulphonamide or sulphide such as diphenylsulphone, N,N-diethyl-4-phenoxy benzenesulphonamide or phenoxathiin. A Lewis Acid such as titanium tetrachloride can be present during the grinding operation. Alternatively there may be present, during the grinding, an oxidizing agent capable of generating tetravalent titanium in the presence of titanium trichloride, for example carbon tetrachloride or gaseous oxygen. The grinding can be effected in a ball-mill or a vibrating mill. The materials may be added during the grinding and the temperature may be varied during the grinding. A liquid which is a solvent for the organo-sulphur compound or complexes thereof with aluminum chloride may be present during a part of the grinding. The ground product can be used, together with an organo metallic compound such as an alkyl aluminium compound, as a catalyst for the polymerization of olefine monomers such as propylene. The catalyst may also include a Lewis Base compound. Some catalysts of this type combine high activity and high stereospecificity.

32 Claims, No Drawings

TRANSITION METAL COMPOUND

This is a continuation, of application Ser. No. 803,376 filed June 3, 1977, now abandoned.

Which is a continuation-in-part of application Ser. No. 788,643 filed Apr. 18, 1977, now abandoned, which is in turn a continuation-in-part of application Ser. No. 647,989 filed Jan 9, 1976, now abandoned.

The present invention relates to the treatment of compounds of transition metals, olefine polymerisation catalysts including such treated compounds and the polymerisation of olefines using such catalysts.

According to the present invention, there is provided a process wherein a solid compound of a transition metal of Groups IVA to VIA of the Periodic Table, is ground with at least one sulphur-containing organic compound which is selected from sulphone compounds of the formula

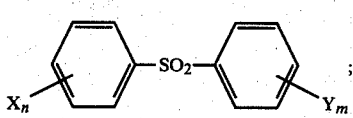

sulphonamide compounds of the formula

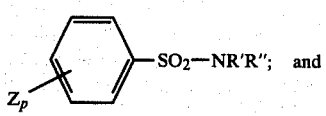

sulphide compounds of the formula

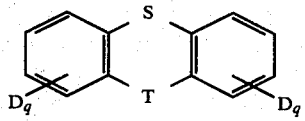

where

X, or each X, is, independently, a halogen atom, an alkyl, aryl, alkoxy, aryloxy, alkylthio, or arylthio group, or a group —NRR', or two groups X can together form a saturated or unsaturated hydrocarbon ring;

Y, or each Y, is, independently, a halogen atom, an alkyl, aryl, alkoxy, aryloxy, alkylthio, or arylthio group, or a group —NRR', or two groups Y can together form a saturated or unsaturated hydrocarbon ring; or a group X and a group Y may be replaced by a link between the two phenyl groups attached to the —SO$_2$— group, the linkage being either direct or through a group —O—, —CH$_2$—, —NR—, —S— or —CO—;

Z, or each Z, is, independently, a halogen atom, an alkyl, aryl, alkoxy, aryloxy, alkylthio, or arylthio group, or a group —NRR', or two groups Z can together form a saturated or unsaturated hydrocarbon ring;

D or each D, is, independently, a halogen atom, an alkyl, aryl, alkoxy, aryloxy, alkythio or arylthio group, or a group —NRR';

T is —S—, —O—, —NR— or —CO—;
R is a hydrogen atom or a hydrocarbyl group;
R' is a hydrocarbyl group;
R" is a hydrocarbyl group or can be a group

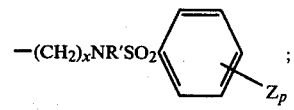

n, m, p and q are each, independently, an integer from 0 up to 5; and x is a positive integer.

In the transition metal compound, it is preferred that the metal has a valency below its maximum. The transition metal can be, for example, zirconium or vanadium, but it is particularly preferred to use a compound of titanium. It is preferred that the transition metal compound is a transition metal halide or oxyhalide (for example VOCl$_2$), and in particular a chloride, especially titanium trichloride. The term "titanium trichloride" is used herein to refer not only to pure titanium trichloride, but also titanium trichloride compositions which incorporate other materials, in particular aluminium chloride or alkyl aluminium chlorides. Such forms of titanium trichloride are obtained by the reduction of titanium tetrachloride with aluminum metal or an organo-aluminium compound. Materials of the type, titanium trichloride/aluminium chloride, which are obtainable by the reduction of titanium tetrachloride with aluminium metal, are particularly preferred.

In the sulphone compounds, both m and n may be zero, when the compound is diphenylsulphone. Alternatively, m is one and n is zero or m and n are both one. Compounds in which m is one and n is zero include 4-(phenylthio)diphenylsulphone and 4-(phenoxy)diphenylsulphone. Compounds in which m and n are both one include 2,4'-(diphenoxy)diphenylsulphone; 4,4'-(diphenoxy)diphenylsulphone; 4,4'-dichlorodiphenylsulphone and 4,4'-(dimethyl)diphenylsulphone. 2,4,4'-(trimethyl)diphenylsulphone is a compound in which m is two and n is one. 6-phenylsulphonyl tetralin is an example of a compound in which two groups X together form an unsaturated hydrocarbon ring; in such a compound n is two and m is zero. Dibenzothiophen-5,5-dioxide is an example of a compound in which X and Y are replaced by a direct linkage between the two phenyl groups attached to the —SO$_2$— group. Phenoxathiin-10,10-dioxide is an example of a compound in which X and Y are replaced by a link through a group —O— between the two phenyl groups attached to the —SO$_2$— group. Thioxanthene-10,10-dioxide is an example of a compound in which X and Y are replaced by a link through a group —CH$_2$— between the two phenyl groups attached to the —SO$_2$— group, and in 10-methylphenothiazine-5,5-dioxide, X and Y are replaced by a link through a group —N(CH$_3$)—.

In the sulphonamide compounds, when p is zero, the compound is a benzenesulphonamide derivative such as N,N-dimethyl-benzenesulphonamide, N,N-diethyl-benzenesulphonamide or N,N-diphenyl-benzenesulphonamide. When p is one, the group Z may be, for example, a bromine or chlorine atom, or a phenoxy group. The groups R' and R" are the same or different, and may be, for example methyl, ethyl or phenyl groups as in N-methyl-N-phenyl-4-bromobenzenesulphonamide; N-methyl-N-phenyl-4-chlorobenzenesulphonamide; and N,N-diethyl-4-phenoxybenzenesulphonamide. Alternatively, the group R" can be a group

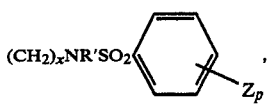

for example the group N-methyl-N-benzenesulphonyl aminoethyl,

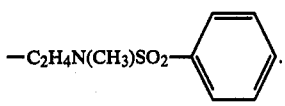

An example of such a compound is N,N'-dibenzenesulphonyl-N,N'-dimethyl-1,2-diaminoethane.

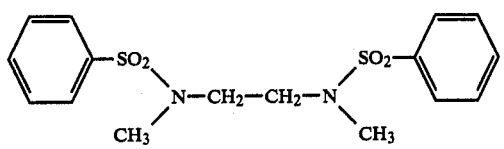

In the sulphide compound, when each q is zero, the compound is phenoxathiin, thianthrene or an N-hydrocarbyl phenothiazine such as N-methylphenothiazine.

For convenience, the term "organo-sulphur compound" will hereafter be used to refer to sulphur-containing organic compounds having one of the defined formulae.

The grinding of the solid compound of a transition metal and at least one organo-sulphur compound is desirably effected using a molar excess of the transition metal compound. In general we prefer to grind the solid compound of a transition metal with from 1 up to 100% molar, relative to the transition metal compound, of at least one organo-sulphur compound. We particularly prefer that the transition metal compound is ground with from 5 up to 100% molar and especially with from 10 up to 50% molar of an organo-sulphur compound.

It will however be appreciated that the effect of the organo-sulphur compound will be influenced by the nature of the organo-sulphur compound, and thus the preferred amount of the organo-sulphur compound will vary in accordance with the particular organo-sulphur compound which is being used. It should also be noted that the nature of the solid transition metal compound also influences the effect, and hence the preferred amounts, of the organo-sulphur compound. Thus, if the solid transition metal compound is titanium trichloride, the preferred amounts of the organo-sulphur compound are greater if this is the product obtained by reducing titanium tetrachloride with aluminium metal than if the product of reducing titanium tetrachloride with titanium metal or hydrogen is used.

In addition to the solid transition metal compound and the organo-sulphur compound which are present during the grinding, we prefer that a Lewis Acid compound is also present, the Lewis Acid compound being different from the solid compound of a transition metal. The Lewis Acid may be, for example, aluminium chloride or, preferably, titanium tetrachloride. The Lewis Acid may be added separately or may be added as a complex with the organo-sulphur compound. If a complex of Lewis Acid and the organo-sulphur compound is used, further uncomplexed Lewis Acid or organo-sulphur compound may be added to the grinding process.

Alternatively, grinding can be effected in the presence of at least one oxidising agent. The oxidising agent can be such as to generate a Lewis Acid compound from the solid compound of a transition metal. Suitable oxidising agents include oxygen gas or halogen-containing materials such as chlorine gas, carbon tetrachloride, hexachlorocyclopentadiene, stannic chloride, phosphorus pentachloride and iodine.

The amount of Lewis Acid present is preferably less than the amount of the solid compound of a transition metal, and may be in the range from 1 up to 50% molar, especially from 5 up to 40% molar, for example 10% molar, relative to the amount of the solid compound of a transition metal. However, the preferred proportions of the Lewis Acid compound are dependent on the particular Lewis Acid compound which is used, and also on the organo-sulphur compound. The amount of oxidising agent used is typically in the range from 0.2 up to 50% molar preferably from 1 up to 30% molar, relative to the amount of the solid compound of a transition metal. However, the preferred proportions for any particular oxidising agent are dependent on the nature of the oxidising agent and also on the organo-sulphur compound.

According to one aspect of the present invention, a solid compound of a transition metal of Groups IVA to VIA of the Periodic Table, wherein the metal has a valency below its maximum, preferably titanium trichloride, is ground with from 5 up to 100% molar, preferably from 10 up to 50% molar, relative to the solid compound of the transition metal, of at least one sulphur-containing organic compound which is selected from sulphone compounds of the formula

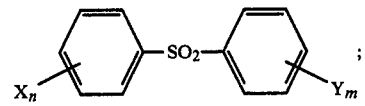

sulphonamide compounds of the formula

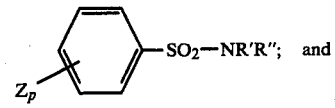

sulphide compounds of the formula

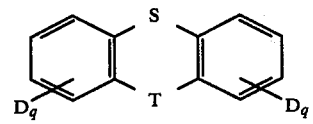

where

D, R', R", T, X, Y, Z, m, n, p and q are as hereinbefore defined, and from 1 up to 50% molar, preferably from 10 up to 40% molar, relative to the solid compound of the transition metal, of at least one Lewis Acid compound which is different from the solid compound of the transition metal, preferably titanium tetrachloride.

It will be appreciated that the Lewis Acid compound may be a material which has been generated during the grinding and is not necessarily a material which has been separately added to the grinding apparatus. If the Lewis Acid is generated from the solid compound of the transition metal, then the quantity generated should be expressed in relation to the number of moles of the residual solid compound of the transition metal since it is this residual quantity which is present at the completion of the grinding.

Preferred organo-sulphur compounds include 4-(phenoxy)diphenylsulphone; 4,4'-dichlorodiphenylsulphone or particularly 4,4'-(dimethyl)-diphenylsulphone, diphenylsulphone, N,N-diethyl-4-phenoxybenzenesulphonamide, N,N-diphenyl-benzenesulphonamide, phenoxathiin, phenoxathiin-10,10-dioxide or thioxanthene-10,10-dioxide.

The grinding is conveniently effected using a ball mill and it is preferred that at least a proportion of the grinding is effected in the dry state; that is in the absence of added solvents and suspending liquids. The materials to be ground can be introduced into the mill or other grinding apparatus either in the absence of solvents, or as a solution or suspension in a suitable inert diluent which is subsequently removed either by heating, reducing the pressure, or both. The grinding can be effected at any suitable temperature and we have obtained satisfactory results by grinding at ambient temperature (about 15°–25° C.) although it will be realised that higher or lower temperatures may be used if desired, for example from −50° C. up to 100° C., especially up to 50° C. Operating at temperatures other than ambient, the temperature is conveniently controlled by using a liquid, for example water, at a desired temperature as the heating or cooling medium for the grinding apparatus.

The grinding can be effected for any suitable length of time, this being dependent on the milling conditions. Thus, when using a ball mill giving a tumbling action, milling times of from 5 hours up to 100 hours or more, for example from 24 up to 72 hours, may be used. It will be appreciated that the grinding time will be dependent on the intensity of the grinding and, with a rotating ball mill, will depend on the material, size and number of balls used, and the speed of revolution of the ball mill.

Alternatively, the grinding may be effected using a grinding acceleration in the range from 12 up to 200 m/s$^2$ and under these conditions a grinding time of from 1 up to 50 hours may be used. Grinding under these conditions is conveniently effected using a vibrating ball mill. Grinding is preferably effected using a grinding acceleration of 20 to 150 m/s$^2$. When using a vibrating mill, the desired grinding acceleration may be varied either by changing the amplitude or frequency of vibration, or both. Thus, if a vibrating mill is vibrated at 2800 oscillations per minute, a sufficient grinding acceleration can be achieved if the amplitude of each oscillation is from 1 up to 3 mm, conveniently 2 mm. It is preferred to effect grinding for a time of from 5 to 25 hours. The grinding time will depend on the intensity of the grinding and it will be appreciated that this is dependent not only on the grinding acceleration but also, when using a vibrating ball mill, on the material of the balls and also the number and size of the balls.

The ground product may be removed from the grinding apparatus as a dry solid but, when using a rotating ball mill, it may be more readily removed by adding a suitable liquid medium, in particular an inert organic liquid such as an aliphatic hydrocarbon, and washing out the ground solid as a suspension in the liquid medium. A convenient procedure is to add a suitable inert liquid medium to the rotating ball mill and its contents and to continue the grinding process for a brief period, which is preferably not more than 30 minutes, and is in particular from 5 up to 20 minutes. The suspension thereby obtained is readily removed from the rotating ball mill and residual quantities can be washed out using further quantities of the inert liquid medium. There appears to be a rapid reduction in the particle size of the solid during the wet grinding stage, and in order to avoid an undesirable particle size reduction, it is preferred to effect the wet grinding for only a relatively short period of time.

When using a vibrating ball mill, the ground product is conveniently removed from the mill by the passage of a slow current of an inert gas, such as nitrogen, through the mill whilst it is still vibrating.

Whilst the process of the present invention may be effected by mixing all the components together and grinding in the absence of added solvents or suspending liquids at an essentially constant temperature, it will be appreciated that additional quantities of the materials being ground may be added during the course of the grinding, or the temperature may be varied during the grinding or a liquid may be present during part of the grinding.

Thus, according to a further aspect of the present invention, at least a part of the organo-sulphur compound is added continuously or intermittently during at least part of the grinding. Using such a procedure, a part of the organo-sulphur compound may be present from the start of the grinding, and this part is conveniently up to 50%, and especially from 10% up to 30%, of the total amount of the organo-sulphur compound which is ground with the compound of the transition metal. The remaining part of the organo-sulphur compound is added during the course of the milling.

Using continuous or intermittent addition, it is preferred that all of the organo-sulphur compound is added some time before the grinding is completed. More specifically, it is preferred that all of the organo-sulphur compound has been added before 95% of the grinding time has elapsed. It is especially preferred that the addition of the organo-sulphur compound is completed at from 40% up to 85% of the grinding time, for example from 55 up to 70% of the grinding time.

All, or a part, of the organo-sulphur compound is added during the grinding and is added either continuously or intermittently. Continuous addition of the organo-sulphur compound is preferably effected using a liquid organo-sulphur compound or a solution of the organo-sulphur compound in a suitable inert diluent. If the organo-sulphur compound is added in a diluent, it is preferred that the grinding apparatus is evacuated to evaporate off the diluent at least once before completion of the grinding, so that at least a part of the final stage of the grinding is effected in the absence of the inert diluent. Intermittent addition of the organo-sulphur compound may be preferred if a solid organo-sulphur compound is used and this addition may be effected by interrupting the grinding in order to add each further quantity of the organo-sulphur compound. It will however be appreciated that using suitable apparatus, continuous or intermittent addition of solid or liquid organo-sulphur compounds can be effected.

If a Lewis Acid compound or an oxidising agent, is present during the grinding, all of the Lewis Acid compound, or all of the oxidising agent, may be added so as to be present at the start of the grinding, or a part of the Lewis Acid compound, or a part of the oxidising agent, may be added at the start of the grinding and the remainder added during at least part of the grinding, or all of the Lewis Acid compound, or all of the oxidising agent, may be added during the grinding. If there is to be a Lewis Acid compound present during the grinding, all of the Lewis Acid compound is conveniently added as a complex with a part of the sulphur compound at the start of the grinding and the remainder of the sulphur compound is added during the grinding.

The temperature may be varied during the grinding and such temperature variation conveniently includes effecting at least one stage of the grinding at a temperature below 0° C. and at least another stage of the grinding at a temperature above 0° C., the maximum temperature of grinding being at least 10° C. higher than the minimum temperature of grinding.

The temperature below 0° C., is conveniently not below −50° C., for example in the range from −25° C. up to −5° C. The temperature above 0° C., is conveniently not above 100° C., for example in the range from 5° C. up to 60° C., especially about ambient temperature, that is about 15° C. to 25° C. For convenience, grinding at a temperature below 0° C. will be referred to as "cold grinding" and grinding at a temperature above 0° C. will be referred to as "hot grinding".

It will be appreciated that grinding may be effected by grinding first hot and then cold, or grinding may be started cold and the temperature raised, or allowed to rise, during the grinding so that hot grinding subsequently occurs. If the grinding is effected first cold and then hot, grinding may be terminated after the hot grinding stage, but a further final cold grinding stage may be included.

The cold grinding stage and the hot grinding stage may each be effected at one temperature only, but it will be appreciated that each of these stages may be operated as two or more sub-stages, each sub-stage being operated at a different temperature. Thus, grinding may be effected, in turn, at temperatures of −20° C., −5° C., about 0° C. and ambient temperature, and optionally at −20° C. once again.

The grinding temperature may be controlled by the use of a heat-exchange fluid in the known manner. Thus, if the grinding apparatus is provided with a cooling, or heating, jacket, the heat-exchange fluid at the desired temperature is passed through the jacket. Alternatively, the heat-exchange fluid may be run continuously over the exterior surface of the grinding apparatus.

The temperature may be changed between the cold and hot grinding stages, or the sub-stages, either by continuing to grind whilst allowing the temperature to change, for example by changing the temperature of the heat-exchange fluid, or by terminating the grinding and transferring the grinding apparatus from an environment maintained at one temperature to a different environment maintained at a different (higher or lower) temperature. If the second procedure is used, it is possible to interrupt the grinding process between each stage, or sub-stage, for a time of up to at least 25 hours. However, it will be appreciated that, when working on a commercial scale, it is preferable to grind continuously with the temperature changes being effected during the course of the grinding.

The procedure of adding components continuously or intermittently and varying the temperature may be combined. Thus, some or all of the organo-sulphur compound, and any optional Lewis Acid or oxidising agent may be added during the grinding, either continuously or intermittently. If added intermittently, the addition may be effected between the stages, or sub-stages, when the grinding is interrupted between each stage or sub-stage. If quantities of the organo-sulphur compound, and any optional Lewis Acid or oxidising agent, are added during the grinding, the addition of such quantities is desirably completed before the commencement of the last stage or sub-stage of the grinding. If there is to be a Lewis Acid as well as an organo-sulphur compound present during the grinding process, it is convenient to add both materials, particularly as a complex thereof, before the grinding is commenced and then to add further quantities of the organo-sulphur compound during the course of the grinding. Thus, if the grinding is effected at −20° C., −5° C., about 0° C. and ambient temperature, a complex of the organo-sulphur compound and a Lewis Acid, typically $TiCl_4$, for example the complex of the approximate formula [diphenylsulphone.$2TiCl_4$], the complex containing 25% of the total organo-sulphur compound to be added, is introduced into the grinding apparatus before grinding is commenced, and the remaining quantity of the organo-sulphur compound is added, in equal portions, before commencing the grinding at each of the subsequent grinding temperatures.

In yet a further alternative procedure, the solid compound of the transition metal is such a material which is associated with aluminum chloride and grinding with the organo-sulphur compound is effected in the presence of an inert liquid which is a solvent for aluminium chloride or a complex of aluminium chloride and the organo-sulphur compound, the inert liquid is then removed and grinding is continued in the absence of the inert liquid.

The aluminium chloride which is associated with the compound of a transition metal is conveniently introduced during the preparation of the compound, for example by reduction using a controlled proportion of an organo-aluminium compound or using aluminium metal. The material is conveniently one represented by the general formula $[TiCl_3.yAlCl_3]$ wherein y has a value of from 0.05 up to 1.00 preferably 0.20 up to 0.85, for example about 0.33.

The inert liquid is preferably an aromatic liquid such as benzene, toluene, xylene or chlorobenzene. The amount, in grammes, of the inert liquid used is preferably at least equal to the amount, in grammes, of the total transition metal composition, that is the compound of the transition metal and the associated aluminium chloride, and is especially from 1 up to 20 times the weight of the total transition metal composition.

The inert liquid is removed from the compound of the transition metal by any suitable means. Thus, the inert liquid can be evaporated from the compound of the transition metal or can be decanted from the grinding apparatus or the whole mixture can be removed from the grinding apparatus, filtered and the solid returned to the grinding apparatus. Alternatively, the inert liquid is removed by washing with a more volatile, inert liquid, such as butane or pentane, and this more volatile liquid is then evaporated off.

If a Lewis Acid compound is present during the grinding process, this is preferably titanium tetrachloride but it may be aluminium chloride which is additional to that associated with the compound of the transition metal compound.

The procedure of grinding in the presence of an inert liquid and then in the absence of the inert liquid may be combined with varying the temperature during the grinding and/or intermittently or continuously adding the organo-sulphur compound during the grinding.

If the grinding process is carried out in more than one stage, for example by hot and cold grinding or grinding in the presence and then the absence of an inert liquid, for each stage of the grinding, times of from 1 hour up to 100 hours can be used, for example from 5 up to 50 hours. If each stage is effected as a number of sub-stages, the total time of all the sub-stages forming one stage should not exceed 100 hours. If the grinding process starts with a cold grinding stage and the subsequent hot grinding stage is followed by a further cold grinding stage, it is preferred that this further cold grinding is effected for only a short period of time, for example from one minute up to one hour.

The ground transition metal compound obtained by the processes hereinbefore described is particularly useful as a component of an olefine polymerisation catalyst.

Thus, according to a further aspect of the present invention, there is provided an olefine polymerisation catalyst comprising:

(1) a transition metal compound which is the product of grinding a solid compound of a transition metal of Groups IVA to VIA of the Periodic Table (Component A) with at least one sulphur-containing organic compound which is selected from sulphone compounds of the formula

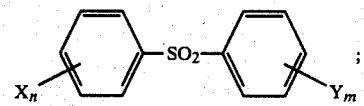

sulphonamide compounds of the formula

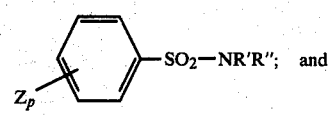

sulphide compounds of the formula

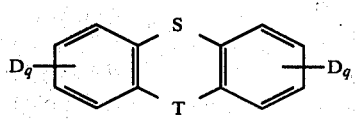

where
D, R', R", T, X, Y, Z, m, n, p and q are all as hereinbefore defined (Component B); and (2) at least one organo-metallic compound of aluminium, or of a non-transition metal of Group IIA of the Periodic Table, or a complex of an organo-metallic compound of a non-transition metal of Group IA or IIA of the Periodic Table and an organo-aluminium compound.

Component (1) of the catalyst is a material obtained by grinding a solid compound of a transition metal with an organo-sulphur compound in the manner hereinbefore described, and it will be appreciated that component (1) includes materials obtained by effecting the grinding in the additional presence of at least one Lewis Acid compound (Component (1)C), or at least one oxidising agent (Component (1)D).

Component (2), the organo-metallic compound, can be a Grignard reagent which is substantially ether free, or a compound of the type $Mg(C_6H_5)_2$. Alternatively, component (2) can be a complex of an organo-metallic compound of a metal of Groups IA or IIA, such as, for example $Mg(AlEt_4)_2$ or a lithium aluminium tetraalkyl. It is preferred that component (2) is an organo-aluminium compound such as a bis(dialkyl aluminium)oxyalkane, a bis(dialkyl aluminium)oxide, an aluminium hydrocarbyl sulphate, an aluminium hydrocarbyl oxyhydrocarbyl or particularly an aluminium trihydrocarbyl or dihydrocarbyl aluminium hydride or halide especially aluminium triethyl or diethyl aluminium chloride since catalysts including aluminium triethyl give a high polymerisation rate whilst catalysts including diethyl aluminium chloride give a relatively high percentage yield of the desirable insoluble (isotactic) polymer. A mixture of compounds can be used if desired, for example a mixture of an aluminium trialkyl and an aluminium dialkyl halide. It may be preferred to use catalysts giving a low level of residual halogen in the polymer product, in which case component (2) is desirably a halogen-free compound, particularly an aluminium trihydrocarbyl.

In addition to components (1) and (2), the catalyst may include a further component which is at least one organo-Lewis Base compound (component (3)). The organo-Lewis Base compound can be any such Lewis Base which is effective to alter the activity and/or stereospecificity of a Ziegler catalyst system. A wide range of such Lewis Bases have been proposed which have such an effect and these include ethers; esters such as methylmethacrylate; ketones; alcohols; the sulphur containing analogues of the ethers, esters, ketones and alcohols; sulphones; sulphonamides; organo-silicon compounds such as the silanes and siloxanes; amides such as formamide; urea and thiourea and the substituted derivatives thereof such as N,N,N',N'-tetramethylurea; alkanolamines such as $\beta$(N,N-dimethylamino)ethanol; amines such as triethylamine and tributylamine; cyclic amines such as pyridine, quinoline and substituted derivatives thereof such as $\alpha$-picoline; diamines such as N,N,N',N'-tetramethylethylenediamine; and the organo phosphines, phosphine oxides, phosphites, and phosphates such as tributylphosphine, triphenylphosphine, tributylphosphine oxide, triphenylphosphine oxide, triethylphosphite and triethylphosphate. We particularly prefer to use, as the organo-Lewis Base compound, secondary or tertiary amines such as dibutylamine or tributylamine, diamines such as N,N,N',N'-tetramethylethylenediamine, and compounds which include both phosphorus and nitrogen atoms, such as hexamethylphosphoric triamide; N,N,N',N'-tetramethylethyl phosphorodiamidate; N,N,N',N',N"-pentamethyl-N"-$\beta$-dimethylaminoethyl-phosphoric triamide; 2-dimethylamino-1,3-dimethyl-1,3,2-diazaphospholidine-2-oxide and octamethylpyrophosphoramide.

The use of organo-Lewis Base compounds, or complexes including organo-Lewis Base compounds, in olefine polymerisation catalysts, is disclosed, inter alia in British Patent Specifications 803 198; 809 717; 880 998; 896 509; 920 118; 921 954; 933 236; 940 125; 966 025; 969 074; 971 248; 1 013 363; 1 017 977; 1 049 723; 1 122

010; 1 150 845; 1 208 815; 1 234 657; 1 324 173; 1 359 328; 1 383 207; 1 423 658; 1 423 659 and 1 423 660 and Belgian Patent Specification 693 551.

British Patent Specification 1 427 842 describes the use of organo-phosphine oxide derivatives wherein at least one group attached to the phosphorus atom is a heterocyclic group containing more than 3 atoms, preferably five or six atoms, in the ring which is attached to the phosphorus atom by a carbon or heteroatom. British Patent Specification 1 429 242 describes the use of a Lewis Base which is an organo-phosphine oxide wherein the phosphorus atom is included, together with 3 other heteroatoms, in an endocyclic ring system. The compounds described in these copending applications may also be used as the organo-Lewis Base compound.

In addition to, or instead of, the organo-Lewis Base compounds, the catalyst may also include a substituted or unsubstituted polyene (Component (4)), which may be an acyclic polyene such as 3-methylheptatriene(1,4,6) or a cyclic polyene such as cyclooctatriene, cyclooctatetraene or cycloheptatriene or derivatives of such polyenes such as the alkyl- or alkoxy-substituted polyenes; tropylium salts or complexes, tropolone or tropone.

The proportions of the various catalyst components can be varied widely depending both on the materials used and the absolute concentrations of the components. However, in general for each molecular proportion of the solid compound of a transition metal which is present as component (1)(A) of the catalyst, there is present at least 0.05, and preferably at least 1.0 molecular proportions of component (2), but it may be desirable to use much greater quantities of component (2), for example as many as 50 molecular proportions or even more, for each molecular proportion of the transition metal compound. In general we prefer to use not more than 25, and particularly not more than 10, molecular proportions of component (2) for each molecular proportion of the solid compound of a transition metal. The amount of the organo-Lewis Base compound, which the optional component (3), is in the range from 0.01 up to 10, preferably from 0.05 up to 5.0, and especially from 0.2 up to 2 molecular proportions for each molecular proportion of the solid compound of a transition metal which is present as component (1)(A) of the catalyst, and the amount of component (3) is less than the amount of component (2). Any polyene which is present in the catalyst should preferably be present in a molar proportion which is less than the molar proportion of component (2) of the catalyst. For each molecular proportion of component (2), the molecular proportions of the polyene are conveniently in the range from 0.01 up to 1.0, especially 0.05 up to 0.5, for example 0.2. If the catalyst includes both components (3) and (4) the molecular proportions of the organo-Lewis base compound which is compound (3) of the polyene should preferably, in total, be less than the molecular proportion of component (2) of the catalyst. If the catalyst includes both components (3) and (4), these can conveniently be used in equimolar proportions but the relative proportions of these components may be varied to give the optimum result.

A preferred catalyst within the present invention comprises:

(1) a titanium trichloride containing material obtained by milling (A) a titanium trichloride/aluminium trichloride material in the presence of (B) from 5 up to 100% molar, preferably from 10 up to 50% molar, relative to the titanium trichloride, of at least one sulphur-containing organic compound which is selected from sulphone compounds of the formula

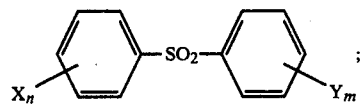

sulphonamide compounds of the formula

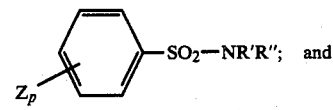

sulphide compounds of the formula

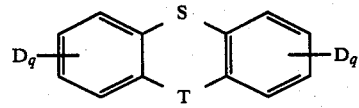

where

D, R',R", T, X, Y, Z, m, n, p and q are all as hereinbefore defined, and (C) from 1 up to 50% molar, preferably from 10 up to 40% molar, relative to the titanium trichloride of at least one Lewis Acid compound which is not titanium trichloride; preferably titanium tetrachloride;

(2) at least one organo-aluminium compound; and (3) at least one organo-Lewis Base compound.

It is preferred to wash component (1) with a suitable inert liquid, such as an inert hydrocarbon or halohydrocarbon, before mixing it with the other catalyst components. Alternatively, component (1) can be heated, optionally in the presence of an inert liquid, to a temperature in the range from 60° C. up to 200° C. The heating step and the washing can be combined by washing component (1) with an inert liquid at a temperature in the range from 60° C. up to 200° C.

The Lewis Base which is component (3) of the catalyst is conveniently hexamethylphosphoric triamide; 2-dimethylamino-1,3-dimethyl-1,3,2-diazaphospholidine-2-oxide; N,N,N',N',N"-pentamethyl-N"-β-dimethylamino-ethyl phosphoric triamide; tetramethylethylenediamine; tributylamine or diphenylsulphone.

The catalysts of the present invention are particularly suitable for the polymerisation and copolymerisation of olefine monomers by contacting at least one olefine monomer with a catalyst of the type hereinbefore defined.

More specifically, there is provided a process for the production of a polymer or copolymer of an olefine monomer wherein at least one olefine monomer, or a mixture of at least one olefine monomer and ethylene, is contacted with a polymerisation catalyst comprising:

(1) a transition metal component obtained by grinding a solid compound of a transition metal of groups IVA to VIA of the Periodic Table (Component A), with at least one sulphur-containing organic compound which is selected from sulphone compounds of the formula

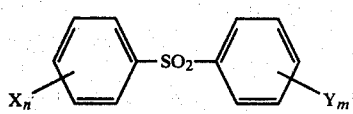

sulphonamide compounds of the formula

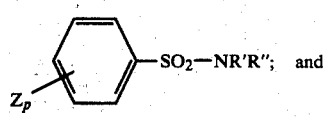

sulphide compounds of the formula

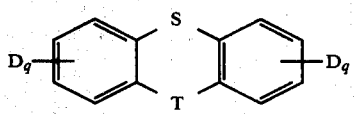

where

D, R', R", T, X, Y, Z, m, n, p and q are all as hereinbefore defined (Component B), and optionally at least one Lewis Acid compound which is different from the solid compound of the transition metal preferably titanium tetrachloride (Component C); and (2) at least one organo-metallic compound of aluminium or of a non-transition metal of Group IIA of the Periodic System, or a complex of an organo-metallic compound of a non-transition metal of Group IA or IIA of the Periodic System and an organo-aluminium compound; and optionally (3) at least one organo-Lewis Base compound; and/or (4) a substituted or unsubstituted polyene.

Any olefine monomer, particularly mono-α-olefine monomer, which is capable of being polymerised using a Ziegler catalyst may be polymerised by the process of the present invention. Thus, monomers which can be polymerised by the present process include butene-1, and 4-methylpentene-1 and particularly propylene. These olefines may be copolymerised together but we prefer to effect copolymerisation with ethylene, conveniently using a sequential polymerisation process such as described in British Patents 970 478; 970 479 and 1 014 944.

We have found that the process of the present invention can be used for the polymerisation of propylene to give a high yield of polymer relative to the amount of catalyst used and also a relatively low proportion of the undesirable soluble polymer.

It is well known that catalysts of the "Ziegler" type are susceptible to the effects of impurities and the activity and stereospecificity of such catalysts can be affected in a detrimental manner by the presence of small quantities of impurities, particularly oxygen and polar compounds such as water and alcohol in the monomer and/or diluent when used. Thus, for the polymerisation of olefine monomers using Ziegler catalysts, it is known to use pure monomers and diluents. However, when using catalysts in accordance with the present invention, these can be used in smaller proportions than the conventional Ziegler type catalyst and accordingly are more susceptible to any impurities present in the system. Thus, for use with the catalyst of the present invention, it is desirable that the monomers and any diluents which are of commercial purity are subjected to a further purification procedure.

The purification treatment can be effected in more than one stage if desired. The particular purification treatment used will be dependent on the purity of the starting materials.

Satisfactory purity can be achieved in most cases by passing the monomer (and diluent, if used) through a bed of a material which is capable of absorbing the impurities contained in the monomer or diluent, for example as described in British Patent Specification Nos. 1 111 493 and 1 226 659.

Using catalysts in accordance with the present invention, polymerisation can be carried out in the presence or absence of an inert diluent such as a suitably purified paraffinic hydrocarbon. If a diluent is not used, polymerisation can be effected in the liquid phase using excess liquid monomer as the suspension medium for catalyst and polymer product. If the monomer is used in the gaseous phase, polymerisation can be effected using any technique suitable for effecting a gas/solid reaction such as a fluidised bed reactor system or a ribbon blender type of reactor.

Polymerisation may be effected either in a batch manner or on a continuous basis. The catalyst components may be introduced into the polymerisation vessel separately but it may be preferred, particularly if polymerisation is being effected on a continuous basis, to mix all the catalyst components together before they are introduced into the polymerisation reactor. Alternatively, in a batch process, not all of the catalyst is added at the beginning of the polymerisation. Thus, a proportion of the catalyst may be added to initiate polymerisation and further quantities of one or more of the catalyst components are added at one or more times during the polymerisation. Conveniently at least 25% of each catalyst component is added to initiate polymerisation, the remaining catalyst components being added during the polymerisation. Since feeding a slurry of a solid material may be inconvenient, it may be preferred that all of the transition metal compound is added, together with some of each of the other catalyst components, to initiate polymerisation and the rest of the other catalyst components are adding during the polymerisation. It is desirable that in any mixing of the catalyst components the solid compound of the transition metal is not allowed to come into contact with any organo-Lewis Base compound which is present as component (3) in the absence of the organo-metallic compound which is component (2) of the catalyst.

The polymerisation can be effected in the presence of a chain transfer agent such as hydrogen or a zinc dialkyl, in order to control the molecular weight of the product formed. If hydrogen is used as the chain transfer agent, it is conveniently used in an amount of from 0.01 up to 5.0%, particularly from 0.10 up to 2.0% molar relative to the monomer. The amount of chain transfer agent will be dependent on the polymerisation conditions, especially the temperature which is typically in the range from 20° up to 100° C., preferably from 50° up to 80° C.

Using catalysts in accordance with the present invention, we have been able to polymerise propylene to obtain a high yield, relative to the amount of the transition metal compound present in the catalyst, of a polymer having a high flexural modulus.

Thus, when using a catalyst containing titanium trichloride, a propylene polymer can be obtained wherein the titanium content of the polymer derived from the residual catalyst in the polymer is not more than about 100 parts per million (ppm), by weight and the flexural modulus of the polymer is at least 1.00 GN/m².

The flexural modulus of the polymer is the modulus as measured by the apparatus described in Polymer Age, March 1970, pages 57 and 58 at 1% skin strain after 60 seconds at 23° C. and 50% relative humidity using test samples prepared as in Example 81.

The titanium content of the polymer may be determined by any suitable analytical technique and we have found X-ray fluorescence spectrometry to be a particularly convenient technique of analysis.

Using the process of the present invention, polymers, particularly propylene homopolymers, can be obtained which have a flexural modulus of at least 1.30 GN/m².

Polymers produced in accordance with the process of the present invention have a high molecular weight as indicated by the melt flow index measured according to ASTM Test Method D 1238-70, using Condition N (that is a temperature of 190° C. and a weight of 10 kgm). The polymers have a melt flow index of less than 200 and preferred polymers have a melt flow index of less than 100, particularly less than 50, for example between 5 and 50.

Various aspects of the present invention will now be described with reference to the following Examples which are illustrative of the invention.

EXAMPLE 1

Into a stainless steel mill of 15.2 cm in length and 7.9 cm in diameter, and fitted internally with four metal strips, were introduced 200 stainless steel balls of 12.7 mm diameter and 200 stainless steel balls of 6.35 mm diameter. The mill was sealed, evacuated to 0.2 mm of mercury, and purged with nitrogen, to give a nitrogen atmosphere in the mill. 20% molar (relative to the amount of TiCl₃ subsequently added) of diphenyl sulphone was added to the mill which was evacuated and purged with nitrogen again. About 20 gm of titanium trichloride (Stauffer-AA) were introduced as a solid into the mill which was shaken manually. Finally, 10% molar (based on the TiCl₃ content of the Stauffer-AA) of titanium tetrachloride was introduced into the mill from a syringe. This addition was made over a period of two minutes whilst rotating the mill, this technique providing an even distribution of titanium tetrachloride through the mill. When all the additives had been introduced into the mill it was rotated at 120 rpm for 64 hours. The temperature of the mill was controlled by continuously spraying water at 20° C. over the mill.

After milling for 64 hours, 100 ml of an inert hydrocarbon diluent, having a boiling range of about 170° to 180° C., was added and milling was continued for a further 15 minutes. The resulting slurry was transferred to a storage vessel and the mill was washed four times with 50 ml aliquots of the same inert hydrocarbon diluent. The washings were transferred to the storage vessel.

EXAMPLES 2 TO 25

A further series of millings were carried out using the same general technique as described for Example 1, but in some cases omitting the TiCl₄ or using aluminium chloride in place of the TiCl₄. Details of all the millings (including Example 1) are set out in Table 1 together with some comparative runs (identified by letters) in which the titanium trichloride was milled alone, or with an alkyl sulphone compound.

TABLE 1

| Example or Comparative Example | Moles/100 moles TiCl₃ | | | |
|---|---|---|---|---|
| | Lewis Acid | | Sulphone | |
| | Type | Amount | Type (a) | Amount |
| 1 | TiCl₄ | 10 | DPS | 20 |
| 2 | TiCl₄ | 20 | DPS | 20 |
| 3 | TiCl₄ | 10 | DPS | 30 |
| 4 | TiCl₄ | 15 | DPS | 25 |
| 5 | TiCl₄ | 17.5 | DPS | 35 |
| 6 | TiCl₄ | 30 | DPS | 50 |
| 7 | AlCl₃ | 10 | DPS | 10 |
| 8 | — | NIL | DPS | 10 |
| 9 | — | NIL | DPS | 20 |
| 10 | TiCl₄ | 10 | DMDPS | 20 |
| 11 | TiCl₄ | 10 | DBTD | 20 |
| 12 | TiCl₄ | 10 | DCDPS | 20 |
| 13 | TiCl₄ | 10 | PDPS | 20 |
| 14 | TiCl₄ | 10 | DSDDA | 10 |
| 15 | TiCl₄ | 10 | DMBS | 20 |
| 16 | TiCl₄ | 10 | DEPBS | 20 |
| 17 | TiCl₄ | 10 | TMDPS | 20 |
| 18 | TiCl₄ | 10 | DEBS | 20 |
| 19 | TiCl₄ | 10 | DPBS | 20 |
| 20 | TiCl₄ | 10 | POT | 20 |
| 21 | TiCl₄ | 10 | TAT | 20 |
| 22 | TiCl₄ | 10 | POTD | 20 |
| 23 | TiCl₄ | 10 | TAD | 20 |
| 24 | TiCl₄ | 10 | MPT | 20 |
| 25 | TiCl₄ | 10 | MPTD | 20 |
| A | — | NIL | — | NIL |
| B | TiCl₄ | 10 | MPS | 20 |
| C | TiCl₄ | 10 | BPS | 20 |

Note to Table 1
(a)
DPS is diphenylsulphone.
DMDPS is 4,4'-(dimethyl)-diphenylsulphone.
DBTD is dibenzothiophen-5,5-dioxide.
DCDPS is 4,4'-dichloro-diphenylsulphone.
PDPS is 4-(phenoxy)-diphenylsulphone.
DSDDA is N,N'-dibenzenesulphonyl-N,N'-dimethyl-1,2-diaminoethane.
DMBS is N,N-dimethyl benzenesulphonamide.
DEPBS is N,N-diethyl-4-phenoxybenzenesulphonamide.
TMDPS is 2,4,4'-trimethyl diphenylsulphone.
DEBS is N,N-diethyl benzenesulphonamide.
DPBS is N,N-diphenyl benzenesulphonamide.
POT is phenoxathiin.
TAT is thianthrene.
POTD is phenoxathiin-10,10-dioxide.
TAD is thioxanthene-10,10-dioxide.
MPT is N-methylphenothiazine.
MPTD is 10-methylphenothiazine-5,5-dioxide.
MPS is methyl phenyl sulphone.
BPS is t-butyl phenyl sulphone.

EXAMPLES 26 TO 49

The titanium trichloride products of Examples 1 to 25, and the Comparative Examples were used to polymerise propylene.

The propylene used for the polymerisation had been purified by passing gaseous propylene in turn through a column (3 inches diameter, 3 feet length) containing 1/16 inch granules of Alcoa F1 alumina at 50°-60° C., and then through a similar column containing BTS catalyst (Cupric oxide reduced to finely divided metallic copper on a magnesium oxide support) at 40°-50° C., condensing the issue gas and passing the liquid propylene through four columns (all 3 inches diameter; two of 3 feet in length, two of 6 feet in length) at 25° C., each containing 1/16 inch pellets of Union Carbide 3A molecular sieves.

This treatment reduced the water content of the monomer from 5–10 ppm by volume to <1 ppm by volume and the oxygen content from 1–2 ppm by volume to <0.5 ppm by volume. The level of inert compounds (nitrogen, ethane, etc.) was unchanged at 0.3% and the level of unsaturated hydrocarbons (allene, methylacetylene etc.) was unchanged at <1 ppm.

A polymerisation flask equipped with efficient stirrer and a water jacket was dried carefully and 1 liter of an inert hydrocarbon diluent having a boiling range of about 170°–180° C. was introduced. The diluent was evacuated at 60° C. purged with nitrogen and evacuated which treatment effectively reduced the water and oxygen contents of the diluent to below 10 ppm by weight. The diluent was then saturated with the purified propylene to one atmosphere pressure. Eight millimoles of triethyl-aluminium were introduced followed by four millimoles of hexamethylphosphoric triamide. After half hour 2 millimoles of $TiCl_3$ obtained as described in the preceding Examples were introduced. The pressure in the reaction vessel was maintained at one atmosphere by supply of propylene from a burette. After a period of 2.5 hours from the introduction of the $TiCl_3$ the run was terminated with 10 ml of isopropanol and a sample of supernatant liquid extracted from determining the concentration of soluble polymer dissolved in the polymerisation diluent. The solid was filtered and washed three times with petrol ether and dried in a vacuum oven at 120° C. for an hour. The yield of solid plus calculated soluble polymer equalled within experimental error the propylene loss from the burette.

The results obtained are set out in Table 2, comparative examples being indicated by letters.

TABLE 2

| Example No. | Type of TiCl₃ (b) | Yield of Solid Polymer (g/mMol TiCl₃) (c) | % Wt of Diluent Soluble Polymer (d) |
|---|---|---|---|
| 26 | 1 | 56.9 | 3.8 |
| 27 | 2 | 25.0 | 5.05 |
| 28 | 3 | 45.1 | 2.44 |
| 29 | 4 | 45.9 | 2.8 |
| 30 | 5 | 48.3 | 2.8 |
| 31 | 6 | 24.7 | 4.25 |
| 32 | 7 | 31.6 | 6.7 |
| 33 | 8 | 36.4 | 7.2 |
| 34 | 9 | 22.8 | 6.0 |
| 35 | 10 | 52.6 | 3.2 |
| 36 | 11 | 34.9 | 3.2 |
| 37 | 12 | 53.2 | 4.2 |
| 38 | 13 | 48.8 | 3.2 |
| 39 | 14 | 36.5 | 4.3 |
| 40 | 15 | 16.8 | 4.0 |
| 41 | 16 | 52.1 | 3.1 |
| 42 | 17 | 35.8 | 4.4 |
| 43 | 18 | 19.9 | 4.8 |
| 44 | 19 | 56.8 | 4.3 |
| 45 | 20 | 55.0 | 5.2 |
| 46 | 22 | 42.5 | 3.88 |
| 47 | 23 | 59.2 | 3.21 |
| 48 | 24 | 25.8 | 6.4 |
| 49 | 25 | 38.7 | 3.69 |
| D | A | 34.5 | 9.3 |
| E | B | 9.4 | 11.0 |
| F | C | 6.6 | 10.1 |

Notes to Table 2
(b) The number or letter refers to the Example or Comparative Example describing the milling of $TiCl_3$ component.
(c) Based on solid polymer only relative to the $TiCl_3$ content of the catalyst.
(d) % based on total polymer (solid + soluble) formed.

EXAMPLES 50 TO 74

Polymerisations were carried out for a period of three hours using the procedure as broadly described in Examples 26 to 49. The propylene used contained 0.12% molar of hydrogen relative to the propylene. The catalyst system was 10 millimoles of diethyl aluminium chloride, 0.75 millimoles of hexamethylphosphoric triamide and 2 millimoles of a titanium trichloride material. The results are set out in Table 3.

TABLE 3

| Example No. | Type of TiCl₃ (b) | Yield of Solid Polymer (g/mMol TiCl₃) (c) | % Wt of Diluent Soluble Polymer (d) |
|---|---|---|---|
| 50 | 1 | 25.9 | 0.42 |
| 51 | 2 | 8.7 | 0.92 |
| 52 | 3 | 18.6 | 0.77 |
| 53 | 4 | 23.0 | 0.25 |
| 54 | 5 | 19 | 0.66 |
| 55 | 6 | 10.3 | 0.75 |
| 56 | 7 | 18.5 | 1.16 |
| 57 | 8 | 22.2 | 1.57 |
| 58 | 9 | 13.6 | 1.0 |
| 59 | 10 | 23.1 | 0.8 |
| 60 | 11 | 24.1 | 0.93 |
| 61 | 12 | 23.8 | 1.1 |
| 62 | 13 | 20 | 1.12 |
| 63 | 14 | 15.6 | 1.44 |
| 64 | 15 | 14.4 | 0.38 |
| 65 | 16 | 24.0 | 0.88 |
| 66 | 17 | 13.1 | 0.89 |
| 67 | 18 | 18.9 | 0.28 |
| 68 | 19 | 24.2 | 0.84 |
| 69 | 20 | 24.6 | 0.32 |
| 70 | 21 | 16.5 | 0.29 |
| 71 | 22 | 24.4 | 0.48 |
| 72 | 23 | 24.6 | 0.53 |
| 73 | 24 | 12.8 | 0.33 |
| 74 | 25 | 16.0 | 0.50 |
| G | A | 13.9 | 2.54 |
| H | B | 8.4 | 0.53 |
| J | C | 2.0 | 2.8 |

Notes to Table 3
(b), (c) and (d) - See Table 2.

EXAMPLES 75 TO 77

The milling described in Example 1 was repeated and a sample of the milled product was washed with toluene.

The washing procedure was effected by allowing a slurry, containing about 100 mMol of the titanium chloride, to settle. The supernatant liquid was removed using a syringe. The solid was resuspended at room temperature, in 100 ml of toluene, which had been dried with sodium and nitrogen-purged. The mixture was stirred for 15 minutes, allowed to settle and the supernatant liquid was syringed off. This procedure with toluene was repeated twice more and the solid was resuspended in 200 ml of toluene.

The washed and unwashed titanium trichloride materials were used to polymerise propylene using the procedure of Examples 50 to 74. A product obtained by washing, in the manner described above, the product obtained in accordance with Example 20 (that is milling in the presence of $TiCl_4$ and phenoxathiin) was also used to polymerise propylene. The results are given in Table 4.

TABLE 4

| Example No. | Type of TiCl₃ (e) | Yield of Solid Polymer (g/mMol TiCl₃) (c) | % Wt of Diluent Soluble Polymer (d) |
|---|---|---|---|
| 75 | 75 | 24.2 | 0.53 |

TABLE 4-continued

| Example No. | Type of TiCl₃ (e) | Yield of Solid Polymer (g/mMol TiCl₃) (c) | % Wt of Diluent Soluble Polymer (d) |
| --- | --- | --- | --- |
| 76 | 76 | 32.4 | 0.38 |
| 77 | 77 | 29.8 | 0.34 |

Notes to Table 4
(c) and (d) - See Table 2.
(e) TiCl₃-75 is the unwashed product obtained by repeating Example 1
TiCl₃-76 is the product of washing, with toluene, TiCl₃-75
TiCl₃-77 is the product of washing, with toluene, the milled product of Example 20.

EXAMPLES 78 TO 80

The procedure of Examples 50 to 74 was repeated except that hexamethylphosphoric triamide was omitted from the catalyst which included one millimole of tri(n-butyl)amine and the polymerisation time was 4 hours. The results are given in Table 5.

TABLE 5

| Example No. (f) | Type of TiCl₃ (a)(e) | Yield of Solid Polymer (g/mMol TiCl₃) (c) | % Wt of Diluent Soluble Polymer (d) |
| --- | --- | --- | --- |
| 78 | 1 | 45.8 | 0.6 |
| 79 | 76 | 46.3 | 0.67 |
| 80* | 76 | 44.3 | 0.70 |

Notes to Table 5
(a), (c) and (d) - See Table 2.
(e) - See Table 4.
(f) *In this experiment all the catalyst components were mixed together in toluene, and shaken for one hour before being introduced into the polymerisation vessel.

EXAMPLE 81

A sample of TiCl₃-76 (as defined in the Notes to Table 4) was used to effect polymerisation using liquid propylene.

Polymerisation was carried out in a stainless steel autoclave, of total capacity 8 liters, which was fitted with a water-circulation jacket and a vertical anchor stirring. The autoclave was heated to 70° C., evacuated, and the vacuum was released with propylene (purified as in Examples 17 to 32). The autoclave was then evacuated again and the procedure repeated 5 times and the autoclave was finally brought to a pressure of 2 psi gauge with propylene gas at 25° C. A heptane solution containing 50 gram millimoles of diethyl aluminium chloride was added to the autoclave, followed by 2 gram millimoles of the washed titanium trichloride material, TiCl₃-76. 5 liters of liquid propylene were added to the autoclave immediately after the addition of the titanium trichloride, the stirrer being operated at 150 rpm. This propylene addition was effected by allowing 5.5 liters of liquid propylene to transfer from a burette at 50° C. to the autoclave. Hydrogen (250 gram millimoles) was added and the temperature of the autoclave contents was raised to 65° C. over 10 minutes. The hydrogen was commercially available hydrogen (99.99% pure) which had been further purified by passing through a column (8 inches by 4 feet in length) containing a molecular sieve material (Union Carbide 3A) at 20° C. The hydrogen was stored in the sieve column and drawn off as required. Polymerisation was allowed to proceed at a temperature of 65° C. and a pressure of 435 psi gauge. More hydrogen (48 gram millimoles on each occasion) was added every 30 minutes, seven such additions of hydrogen being made. After polymerisation for 4 hours, the autoclave was vented over a period of 10 minutes to remove unpolymerised propylene, and a free-flowing pink powder was obtained.

A polymer yield of 565 gms/mMol of titanium nominally present in the catalyst was obtained. The polymer had a melt flow index of 6 (Measured by ASTM Test Method D1238-70, Condition N, that is at 190° C. and 10 Kgm).

The flexural modulus of the polymer was 1.34 GN/m². The flexural modulus was measured using a cantilever beam apparatus as described in Polymer Age, March 1970, pages 57 and 58. The deformation of a test strip at 1% skin strain after 60 seconds at 23° C. and 50% relative humidity was measured. The test strip had dimensions of approximately 150×19×1.6 mm and was prepared as follows: 23 g of the polymer was mixed with 0.1% by weight of an antioxidant ('Topanol' CA), and the mixture was added to a Brabender Plasticiser, at 190° C., 30 rpm and under a load of 10 kg to convert it to a crepe. The crepe was placed within a template, between aluminium foil, and pressed by means of an electric Tangye Press at a temperature of 250° C. The pressing was pre-heated for a period of six minutes, under just enough pressure to make the polymer flow across the template, that is an applied force of about 1 ton. After the pre-heat period, the applied force was raised to 15 tons in 5 ton increments, de-gassing (that is releasing pressure) every 5 tons. After 2 minutes at 15 tons, the press was cooled by means of air and water for 10 minutes or until room temperature was reached. The plaque obtained was then cut into strips of dimensions 150×19×1.6 mm. Duplicate strips of each polymer were placed into an annealing oven at 130° C., and after 2 hours at this temperature the heat was switched off and the oven cooled to ambient temperature at 15° C. per hour.

Flexural modulus is dependent on the melt flow index of the polymer and increases by 0.18 GN/m² for an increase in MFI by a factor of 10, for example from MFI 3 up to MFI 30. Applying this relationship, it is calculated that at MFI 20, the flexural modulus of the polymer would be 1.43 GN/m².

EXAMPLES 82 TO 84

The procedure of Examples 78 to 80 was repeated at 70° C. using the milled products of Examples 1, 20 and 23 and a polymerisation time of four hours. The results are given in Table 6.

TABLE 6

| Example No. | Type of TiCl₃ (a) | Yield of Solid Polymer (g/mMol TiCl₃) (c) | % Wt of Diluent Soluble Polymer (d) |
| --- | --- | --- | --- |
| 82 | 1 | 43.1 | 0.71 |
| 83 | 20 | 55.7 | 1.18 |
| 84 | 23 | 60.9 | 1.18 |

Notes to Table 6
(a), (c) and (d) - See Table 2.

EXAMPLE 85

The milling procedure of Example 1 was repeated using 6.54 gms of diphenylsulphone (17.6% molar relative to the TiCl₃ subsequently added) and 33.6 g of Stauffer-AA grade titanium trichloride. Oxygen gas was finally added to the mill in place of the titanium tetrachloride. The amount of oxygen used was 120 ml at room temperature and pressure (equivalent to 2.94% molar relative to the titanium trichloride). The oxygen gas was added from a syringe having a plunger sealed with liquid paraffin.

The milled titanium trichloride product was used to polymerise propylene using the procedure of Examples 50 to 74. Polypropylene was obtained in a yield of 26.0 g/m Mol of titanium trichloride and the amount of diluent soluble polymer was 0.94% by weight.

EXAMPLES 86 TO 88

The milling procedure of Example 1 was repeated except that the titanium tetrachloride was replaced by various amounts of carbon tetrachloride, milling was effected for 24 hours and the final milling in the presence of the inert diluent was effected for two minutes only.

The milled products were used to polymerise propylene using the procedure of Examples 26 to 49. The results obtained are set out in Table 7.

TABLE 7

| Example | Amount of CCl₄ (% molar relative to TiCl₃) | Yield of Solid Polymer (g/mMol TiCl₃) (c) | % Wt of Diluent Soluble Polymer (d) |
|---|---|---|---|
| 86 | 5 | 33 | 4.59 |
| 87 | 10 | 41.2 | 2.8 |
| 88 | 15 | 23.9 | 6.6 |

Notes to Table 7
(c) and (d) are as defined in Notes to Table 2.

EXAMPLE 89

Two millings were carried out using the procedure as described in Example 1. The quantities of Stauffer-AA used in the millings were 32.7 g and 39.9 respectively. The quantity of diphenyl sulphone was 20% molar relative to the TiCl₃ and the quantity of titanium tetrachloride was 10% molar relative to the TiCl₃. Both millings were effected for 24 hours, the inert diluent was added and milling in the presence of the diluent was effected for two minutes.

The suspensions of titanium trichloride material obtained from the two millings was combined. Analysis of the material found a titanium/aluminium atomic ratio of 3.55:1.

EXAMPLE 90

An aliquot portion of the combined suspensions of Example 89 containing about 200 mMol of TiCl₃ was transferred to an argon purged vessel having a glass sinter base and provided with a stirrer. The vessel was immersed in an oil bath at room temperature. The liquid was filtered off and the solid was resuspended in sodium-dried, degassed toluene. The oil bath was heated to 100° C. After 30 minutes at 100° C. the toluene was filtered off.

The solid was then treated with toluene in the manner described twice more. The oil bath was then cooled to room temperature and the solid was treated twice with 100 ml portions of dry, degassed heptane in the manner described for the treatment with toluene. The solid was then suspended in 500 ml of heptane. Analysis of the washed product found a titanium/aluminium atomic ratio of 5.28:1.

EXAMPLES 91 AND 92

The polymerisation procedure of Examples 82 to 84 was repeated using the titanium trichloride products of Examples 89 and 90. The results obtained are set out in Table 8.

TABLE 8

| Example | Type of TiCl₃ (g) | Yield of Solid Polymer (g/mMol TiCl₃) (c) | % Weight of Diluent Soluble Polymer (d) | MFI (h) |
|---|---|---|---|---|
| 91 | 89 | 35.8 | 1.17 | 16.2 |
| 92 | 90 | 51.3 | 1.36 | 27.3 |

Notes to Table 8
(c) and (d) are as defined in Notes to Table 2.
(g) TiCl₃-89 is the combined product of Example 89 and TiCl₃-90 is the washed material of Example 90.
(h) Melt Flow Index was measured by ASTM Test Method D 1238-70, at 190° C. and 10 kgm.

EXAMPLE 93

Propylene was polymerised in the gas phase using the titanium trichloride product of Example 90.

Into a water jacketted, 8 liter stainless steel autoclave fitted with an anchor-shaped stirrer was charged 800 g of polypropylene powder of melt flow index 20 and having a flexural modulus of approximately 1.4 GN/m². The autoclave was heated to 70° C., evacuated and propylene gas added to give a pressure of 20 psi gauge. The autoclave was evacuated and propylene gas added a total of six times over a period of 20 minutes.

The excess propylene pressure was released, the stirrer started and 24 millimoles of diethyl aluminium chloride as a 1.0 M solution in heptane added. After three minutes, one millimole of tributylamine as a 0.5 M solution in heptane was then added. After a further seven minutes, 2 millimoles of the titanium trichloride product of Example 90 was added as a 0.384 M suspension in heptane.

Ten minutes after the addition of the titanium trichloride, the autoclave was pressurised, in stages, to 400 psi gauge with propylene. At pressures of 100, 200, 300 and 400 psi gauge, 20 millimole portions of hydrogen were added. The pressure was maintained at 400 psi gauge by the addition of propylene and the temperature was maintained at 70° C. 10 millimoles of hydrogen was added after the addition of each 200 ml of propylene, the propylene being added by the distillation of liquid propylene.

Four hours after attaining the pressure of 400 psi gauge, the autoclave was vented and the polymer product removed.

The total product (including the 800 g of propylene originally present) had a melt flow index of 18.7, a flexural modulus of 1.39 GN/m² and a measured titanium content of 55 ppm by weight. Making allowance for the titanium content of the initial 800 g of polypropylene, it was calculated that the polypropylene produced during the polymerisation contained 62 ppm by weight of titanium residues from the catalyst.

EXAMPLE 94

The procedure of Example 1 was repeated except that 31.6 g of Stauffer-AA were used (and 20% molar of diphenyl sulphone and 10% molar of titanium tetrachloride), and water at 5° C. was sprayed onto the mill. During the milling the temperature rose from 5° C. Milling was terminated after 24 hours when the temperature had reached 15° C. The step of milling in the presence of the inert hydrocarbon diluent was effected for a time of only two minutes.

EXAMPLE 95

An aliquot of the milled product of Example 94 was washed with hot toluene using the procedure of Example 90. After cooling to room temperature, the solid was treated with, and finally suspended in, an inert hydrocarbon diluent, having a boiling range of about 170° to 180° C., in place of the heptane used in Example 90.

EXAMPLE 96

A further aliquot of the milled product of Example 94 was heated to a temperature of 120° C. and maintained at that temperature, with gentle stirring, for two hours under an atmosphere of argon. The system was then allowed to cool to ambient temperature and the whole mixture was then transferred to a storage vessel.

EXAMPLE 97

A further aliquot of the milled product of Example 94 was washed as described in Example 90 with the exception that a temperature of 120° C. was used instead of 100° C. and, at all stages, both at 120° C. and the subsequent treatment at ambient temperature, the liquid medium used was an inert hydrocarbon diluent having a boiling range of about 170° to 180° C.

EXAMPLE 98

A complex of titanium tetrachloride and diphenyl sulphone was prepared in the following manner.

Into a nitrogen-containing one liter flask equipped with a thermometer and stirrer, was introduced 250 ml of sodium-dried toluene and 87.2 g (0.4 Mol) of diphenylsulphone. The flask was evacuated to vacuum (0.2 mm of mercury pressure) and repressurised with nitrogen to atmospheric pressure. This procedure of evacuation and repressurisation was repeated a further four times.

The flask was then heated to 60° C. and the diphenylsulphone dissolve giving a clear colourless solution. 100 ml (0.92 Mol) of titanium tetrachloride were added from a dropping funnel over a period of two minutes. The temperature of the flask contents rose to 80° C. and a yellow, crystalline solid precipitated out from a reddish solution. The mixture was cooled, with stirring, to 10° C. and then filtered. The solid was washed six times with sodium-dried heptane (100 ml each time) and then dried under vacuum (0.2 mm of mercury) at ambient temperature. A free-flowing lemon yellow solid was obtained which analysis indicated to be $Ph_2SO_2 2TiCl_4$.

Into a ball-mill loaded with stainless steel balls as described in Example 1, was introduced, in turn 27.2 g of Stauffer-AA, 4.09 g of the titanium tetrachloride-diphenylsulphone complex and 4.48 g of diphenylsulphone. The milling procedure of Example 1 was repeated except that milling was effected for 24 hours and water at 20° to 26° C. was sprayed onto the mill. After adding the inert hydrocarbon diluent, milling was continued in the presence of the diluent for only two minutes.

EXAMPLES 99 TO 103

The polymerisation procedure of Examples 82 to 84 was repeated using the milled products of Examples 94 to 98. The results obtained are set out in Table 9.

TABLE 9

| Example | Type of $TiCl_3$ (i) | Yield of Solid Polymer (g/mMol $TiCl_3$) (c) | % Weight of Diluent Soluble Polymer (d) |
|---|---|---|---|
| 99 | 94 | 45 | 1.10 |
| 100 | 95 | 48.2 | 1.43 |
| 101 | 96 | 48.2 | 0.62 |
| 102 | 97 | 51.8 | 1.11 |
| 103 | 98 | 34.3 | 1.24 |

Notes to Table 9
(c) and (d) are as defined in notes to Table 2.
(i) The number refers to the Example describing the milling of the $TiCl_3$ component.

EXAMPLES 104 to 115

Diphenylsulphone was introduced into a ball-mill loaded with stainless steel balls as described in Example 1. The mill was then evacuated to 0.2 mm of mercury and purged with nitrogen. Into the mill was introduced 20 grammes of titanium trichloride, the mill was placed on rollers and titanium tetrachloride (when used) was added from a syringe over a period of one minute. The titanium trichloride used was either the product of reducing titanium tetrachloride with hydrogen gas (Stauffer $TiCl_3$-H) or reducing titanium tetrachloride with titanium metal (Toho Titanium $TiCl_3$-T).

The mill was then rotated at 120 rpm for 64 hours whilst spraying water at 20° C. over the mill. At the end of this period, 100 ml of an inert hydrocarbon diluent, having a boiling point range of about 170° to 180° C., were added and the mill was rotated for a further 15 minutes. The contents of the mill were removed under nitrogen and diluted with a further quantity of the same inert hydrocarbon diluent to approximately 0.3 M of titanium trichloride per liter of suspension. The concentration of trivalent titanium in the suspension was determined by titration with ceric sulphate in sulphuric acid.

Further details of the millings are set out in Table 10, together with comparative examples in which the diphenyl sulphone was omitted.

TABLE 10

| Example or Comparative Example | Type of $TiCl_3$ (j) | Milling Additive (Moles/100 Moles $TiCl_3$) | |
|---|---|---|---|
| | | DPS (a) | $TiCl_4$ |
| 104 | H | 20 | NIL |
| 105 | H | 5 | 10 |
| 106 | H | 10 | 10 |
| 107 | H | 15 | 10 |
| 108 | H | 20 | 10 |
| 109 | H | 5 | 15 |
| 110 | H | 10 | 15 |
| 111 | H | 5 | 20 |
| 112 | H | 10 | 20 |
| 113 | H | 5 | 25 |
| 114 | T | 5 | 10 |
| 115 | T | 10 | 10 |
| K | H | 0 | 0 |
| L | H | 0 | 10 |
| M | H | 0 | 20 |

TABLE 10-continued

| Example or Comparative Example | Type of TiCl₃ (j) | Milling Additive (Moles/100 Moles TiCl₃) DPS (a) | TiCl₄ |
|---|---|---|---|
| N | T | 0 | 0 |

Notes to Table 10
DPS is as defined in Note (a) to Table 1
(j) H is Stauffer TiCl₃—H
T is Toho Titanium TiCl₃—T

EXAMPLES 116 TO 127

The polymerisation procedure of Examples 26 to 49 was repeated using the products of Examples 104 to 115. The results obtained, together with those using the comparative products K to N, are set out in Table 11.

TABLE 11

| Example or Comparative Example | Type of TiCl₃ (k) | Yield of Solid Polymer (g/mMol TiCl₃) (c) | % weight of Diluent Soluble Polymer (d) |
|---|---|---|---|
| 116 | 104 | 3.2 | 4.9 |
| 117 | 105 | 24.7 | 7.0 |
| 118 | 106 | 16.6 | 6.3 |
| 119 | 107 | 6.2 | 4.6 |
| 120 | 108 | 3.2 | 4.9 |
| 121 | 109 | 31.8 | 6.5 |
| 122 | 110 | 19.0 | 5.9 |
| 123 | 111 | 35.9 | 5.2 |
| 124 | 112 | 23.9 | 5.2 |
| 125 | 113 | 26.0 | 5.3 |
| 126 | 114 | 33.7 | 6.8 |
| 127 | 115 | 8.5 | 5.9 |
| P | K | 4.3 | 8.0 |
| Q | L | 11.9 | 7.3 |
| R | M | 16.1 | 6.9 |
| S | N | 30.1 | 7.2 |

Notes to Table 11
(c) and (d) are as defined in Notes to Table 2
(k) The number or letter refers to the Examples or Comparative Example describing the milling of the TiCl₃ component.

EXAMPLES 128 TO 139

The polymerisation procedure of Examples 82 to 84 was repeated using the products of Examples 104 to 115 with the exception that 2 mMol of tri(n-butyl)amine are used. The results obtained, together with those using the comparative products K to N, are set out in Table 12.

TABLE 12

| Example or Comparative Example | Type of TiCl₃ (k) | Yield of Solid Polymer (g/mMol TiCl₃) (c) | % weight of Diluent Soluble Polymer (d) |
|---|---|---|---|
| 128 | 104 | 3.2 | 5.4 |
| 129 | 105 | 16.5 | 7.0 |
| 130 | 106 | 11.5 | 5.7 |
| 131 | 107 | 4.5 | 4.6 |
| 132 | 108 | 3.1 | 3.6 |
| 133 | 109 | 19.3 | 5.1 |
| 134 | 110 | 13.5 | 4.5 |
| 135 | 111 | 32.5 | 3.0 |
| 136 | 112 | 24.5 | 3.6 |
| 137 | 113 | 22.1 | 3.3 |
| 138 | 114 | 29.5 | 7.9 |
| 139 | 115 | 12.2 | 8.0 |
| U | K | 7.0 | 17.6 |
| V | L | 13.0 | 8.0 |
| W | M | 15.0 | 5.0 |
| X | N | 21.6 | 22.3 |

Notes to Table 12
(c) and (d) are as defined in Notes to Table 2
(k) is as defined in Notes to Table 11.

EXAMPLE 140

Into a Megapact Vibration Mill (manufactured by Pilamec, Gloucestershire, England) of internal diameter 3.8 cm and length 56 cm, were introduced 110 stainless steel balls of 12.7 mm diameter and 1700 stainless steel balls of 6.35 mm diameter. The mill was sealed, evacuated to 0.2 mm of mercury and purged with nitrogen to give a nitrogen atmosphere in the mill.

30 g of titanium trichloride (Stauffer-TiCl₃AA) 4.94 g (15% molar relative to the TiCl₃ content of the Stauffer-TiCl₃AA) of diphenylsulphone and 4.51 g (5% molar relative to the TiCl₃ content of the Stauffer-TiCl₃AA) of the complex material, diphenylsulphone.2TiCl₄ were mixed together in a Schlenk tube, by shaking under nitrogen. The mixture was loaded into the mill by careful addition, under nitrogen, over a period of about three minutes.

Milling was effected using a frequency of 2800 oscillations per minute and an amplitude of 2 mm. Cooling was provided by water at about 15° C. After three hours of milling, the product was removed from the mill by a further milling for about 45 minutes whilst passing a slow stream of nitrogen through the mill (about 0.2 ml per second).

The solid milled product was washed four times, under argon, with sodium-dried and argon-purged toluene. Each washing consisted of suspending the solid product in 100 ml of the toluene at 100° C. for 15 minutes, followed by filtration at 100° C. The solid was then washed twice in a similar manner by suspending for 10 minutes in 100 ml of sodium-dried and argon-purged n-heptane at ambient temperature. The solid was stored overnight at ambient temperature in a further 100 ml of n-heptane. The n-heptane was removed and the solid was then washed into a 500 ml flask using 4 separate 50 ml portions of n-heptane.

EXAMPLE 141

The procedure of Example 140 was repeated with the exception that the milling time was 24 hours, and the product was removed from the mill by milling for a further one hour whilst passing nitrogen at a rate of about 0.2 ml per second and then for a further 45 minutes whilst passing nitrogen at a rate of about 1.0 ml per second.

EXAMPLES 142 AND 143

The products of Examples 140 and 141 were used to polymerise propylene using the procedure of Examples 82 to 84.

The results obtained are set out in Table 13.

TABLE 13

| Example No. | Type of TiCl₃ (l) | Yield of Solid Polymer (g/mMol TiCl₃) (c) | % Wt of Diluent Soluble Polymer (d) |
|---|---|---|---|
| 142 | 140 | 35 | 0.9 |
| 143 | 141 | 42 | 1.43 |

Notes to Table 13
(c) and (d) are as defined in Notes to Table 2.
(l) The number refers to the Example describing the milling of TiCl₃ component.

EXAMPLE 144

40 gms of dry polypropylene powder was stirred in a 2 liter glass flask fitted with an anchor stirrer formed from polytetrafluoroethylene. A water jacket kept the flask at 60° C. The flask was evacuated to 1.0 mm of Hg and then pressurised to atmospheric pressure with dry nitrogen to remove air and moisture from the apparatus. This was repeated twice more. The evacuation and pressurisation procedure was then effected three times with propylene containing about 0.12 mol % of hydrogen.

10 mmols of aluminium diethylmonochloride, as a 1.2 molar solution in heptane, was then added to the stirred polymer. After 2 minutes, 1.0 mmol of tri-n-butylamine was added as a 0.5 molar solution in heptane. After a further interval of 2 minutes had elapsed, 2 mmols of the product of Example 140 was added and the propylene/hydrogen mixture added continuously from a metering device so as to maintain the pressure within the apparatus at atmospheric pressure. 15 minutes after the addition of the titanium trichloride product of Example 1, the propylene/hydrogen mixture was turned off and the flask evacuated over 2 minutes to remove heptane from the flask. The pressure was then restored to atmospheric pressure with the propylene/hydrogen mixture and polymerisation allowed to take place for 4 hours, measured from the time that the product of Example 1 was introduced. The total product was then removed from the apparatus and after further drying was found to weigh 85 gms. Thus, 45 gms of polymer were produced during this polymerisation.

EXAMPLE 145

Propylene was polymerised in the gas phase using the titanium trichloride product of Example 140.

The procedure used was essentially as described in Example 93 with the following differences. An initial charge of 400 g of polypropylene powder, of melt flow index 20 and having a flexural modulus of approximately 1.4 GN/m², was used. The autoclave was heated to 70° C., evacuated and nitrogen gas added to give a pressure of 20 psi gauge. The autoclave was evacuated and nitrogen gas added a total of six times over a period of 20 minutes. Finally the autoclave was evacuated and pressurised to 20 psi gauge with propylene.

The excess propylene pressure was released, the stirrer started and 18 millimoles of diethyl aluminium chloride as a 1.0 M solution in heptane added. After three minutes, one millimole of tributylamine as a 0.5 M solution in heptane was then added. After a further seven minutes, 1.5 millimoles of the titanium trichloride product of Example 140 was added as a 0.404 M suspension in heptane.

During the pressurisation of the autoclave with propylene, 15 millimole portions of hydrogen were added for each 100 psi gauge rise in pressure. Polymerisation continued for 4 hours as described in Example 93.

The total product (including the 400 g of propylene originally present) had a melt flow index of 23.4, a flexural modulus of 1.29 GN/m² and a measured titanium content of 60 ppm by weight. Making allowance for the titanium content of the initial 400 g of polypropylene, it was calculated that the polypropylene produced during the polymerisation contained 74 ppm by weight of titanium residues from the catalyst.

EXAMPLE 146

Into a stainless steel mill of 15.2 cm in length and 7.9 cm in diameter, and fitted internally with four metal strips, were introduced 200 stainless steel balls of 12.7 mm diameter and 200 stainless steel balls of 6.35 mm diameter. The mill was sealed, evacuated to 0.2 mm of mercury, and purged with nitrogen, to give a nitrogen atmosphere in the mill.

3.0 g of a complex material, [diphenylsulphone. 1.77 TiCl₄] (0.053 mole of diphenylsulphone and 0.093 mole of titanium tetrachloride relative to the titanium trichloride content of the Stauffer TiCl₃-AA subsequently added to the mill) was added to the mill. The mill was evacuated to 0.2 mm of mercury and purged with nitrogen. 20.0 g of titanium trichloride (Stauffer TiCl₃-AA) were then added.

The mill was rotated at 120 rpm and water at 18° C. was run over the exterior of the mill. After milling for 4 hours, the mill was removed from the milling apparatus and 1.1 g of diphenylsulphone (0.05 mole relative to the titanium trichloride content of the Stauffer TiCl₃-AA) were added.

After 17½ hours, the mill was replaced in the milling apparatus and water at 18° C. was run over the exterior of the mill which was rotated at 120 rpm. After 4 hours, the mill was removed from the milling apparatus and 1.1 g of diphenylsulphone (0.05 mole relative to the titanium trichloride content of the Stauffer TiCl₃-AA) were added.

After 44¼ hours, the mill was replaced in the milling apparatus and water at 18° C. was run over the exterior of the mill which was rotated at 120 rpm. After 8 hours, the mill was removed from the milling apparatus and 1.1 g of diphenylsulphone (0.05 mole relative to the titanium trichloride content of the Stauffer TiCl₃-AA) were added.

After 64 hours, the mill was replaced in the milling apparatus and water at 18° C. was run over the exterior of the mill which was rotated at 120 rpm. After 8 hours the mill was removed from the milling apparatus.

After about 17 hours, the mill was replaced in the milling apparatus, 300 ml of an inert hydrocarbon diluent (boiling point range of about 170° to 180° C.) was added and milling was effected for 5 minutes without running water over the exterior of the mill. The suspension of the ground product in the diluent was readily removed from the mill.

EXAMPLE 147

An aliquot portion of the suspension of the ground product obtained by the process of Example 146, and containing 50 millimoles of titanium trichloride, was placed, under argon, in a vessel provided with a sintered glass filter.

The hydrocarbon diluent was filtered off and the vessel placed in an oil bath maintained at 120° C. 100 ml of the hydrocarbon diluent were introduced into the vessel, the mixture was stirred for 30 minutes and the hydrocarbon diluent was filtered off. This procedure was effected a total of three times. The vessel was then removed from the oil bath, a further 100 ml of the hydrocarbon diluent was added and the solid product was transferred, under argon, to a storage flask, using 150 ml of the diluent to wash residual quantities of the solid product into the storage vessel.

EXAMPLES 148 AND 149

The titanium trichloride products of Examples 146 and 147 were used to polymerise propylene using the procedure of Examples 82 to 84 with propylene containing 0.15% by volume of hydrogen. The results obtained are set out in Table 14.

TABLE 14

| Example | Type of TiCl$_3$ (l) | Yield of Solid Polymer (g/mMol TiCl$_3$) (c) | % Wt of Diluent Soluble Polymer (d) |
|---|---|---|---|
| 148 | 146 | 34.7 | 1.1 |
| 149 | 147 | 44.8 | 0.6 |

Notes to Table 14
(c) and (d) are as defined in the notes to Table 2.
(l) is as defined in the notes to Table 13.

EXAMPLES 150 AND 151

The procedure of Example 144 was repeated using the products of Examples 146 and 147. The results obtained are set out in Table 15.

TABLE 15

| Example | Type of TiCl$_3$ (l) | Yield of Solid Polymer (g/mM TiCl$_3$) (c) |
|---|---|---|
| 150 | 146 | 19.3 |
| 151 | 147 | 25.7 |

Notes to Table 15
(c) is as defined in the notes to Table 2.
(l) is as defined in the notes to Table 13.

EXAMPLE 152

Into a stainless steel mill of 15.2 cm in length and 7.9 cm in diameter, and fitted internally with four metal strips, were introduced 200 stainless steel balls of 12.7 mm diameter and 200 stainless steel balls of 6.35 mm diameter. The mill was sealed, evacuated to 0.2 mm of mercury, and purged with nitrogen, to give a nitrogen atmosphere in the mill.

3.36 g of diphenylsulphone (0.15 mole based on the titanium trichloride content of the Stauffer-TiCl$_3$-AA subsequently added to the mill) was added to the mill followed by 3.1 g of the complex material [diphenylsulphone.1.77 TiCl$_4$] (0.053 mole of diphenylsulphone and 0.093 mole of titanium tetrachloride relative to the titanium trichloride content of the Stauffer TiCl$_3$-AA subsequently added to the mill). The mill was evacuated to 0.2 mm of mercury and purged with nitrogen. 20.5 g of titanium trichloride (Stauffer TiCl$_3$-AA) were then added.

The mill was rotated at 120 rpm and a water/ethylene glycol mixture was run over the exterior of the mill. The temperature of the water/ethylene glycol mixture was initially $-16.5°$ C. but during the milling the temperature rose, reaching a maximum of $-7.5°$ C., falling and being maintained thereafter in the range $-13.5°$ C. up to $-10°$ C. After six hours, milling and cooling were stopped.

After 17¼ hours, milling was recommenced, and the water/ethylene glycol mixture, at a temperature in the range $-7°$ C. to $-5°$ C., was run over the exterior of the mill which was rotated at 120 rpm. After six hours milling was stopped and the mill was removed from the milling apparatus.

After 17¼ hours, the mill was placed in a different milling apparatus, and water at 3° C. was run over the exterior of the mill which was rotated at 120 rpm. After six hours, milling was stopped and the mill was removed from the milling apparatus.

After 17¾ hours, the mill was replaced in the milling apparatus as used in the previous stage, and water at 18° C. was run over the exterior of the mill which was rotated at 120 rpm. After six hours, milling was stopped and the mill was removed from the milling apparatus.

After about 65 hours, the mill was replaced in the milling apparatus as used in the previous two stages and 300 ml of an inert hydrocarbon diluent (boiling point range of about 170°–180° C.) was added and milling was effected for 5 minutes without running water over the exterior of the mill. The suspension of the ground product in the diluent was readily removed from the mill.

EXAMPLE 153

An aliquot portion of the suspension of the ground product obtained by the process of Example 152, and containing 50 millimoles of titanium trichloride, was placed, under argon, in a vessel provided with a sintered glass filter.

The hydrocarbon diluent was filtered off and the vessel placed in an oil bath maintained at 120° C. 100 ml of the hdyrocarbon diluent were introduced into the vessel, the mixture was stirred for 30 minutes and the hydrocarbon diluent was filtered off. This procedure was effected a total of three times. The vessel was then removed from the oil bath, a further 100 ml of the hydrocarbon diluent was added and the solid product was transferred, under argon, to a storage flask, using 150 ml of the diluent to wash residual quantities of the solid product into the storage vessel.

EXAMPLES 154 AND 155

The titanium trichloride products of Examples 152 and 153 were used to polymerise propylene using the procedure of Examples 82 to 84 with propylene containing 0.15% by volume of hydrogen. The results obtained are set out in Table 16.

TABLE 16

| Example | Type of TiCl$_3$ (l) | Yield of Solid Polymer (g/mM TiCl$_3$) (c) | % Wt of Diluent Soluble Polymer (d) |
|---|---|---|---|
| 154 | 152 | 40.5 | 1.5 |
| 155 | 153 | 56.3 | 1.0 |

Notes to Table 16
(c) and (d) are as defined in the notes to Table 2.
(l) is as defined in the notes to Table 13.

EXAMPLES 156 AND 157

The procedure of Example 144 was repeated using the products of Examples 152 and 153. The results obtained are set out in Table 17.

TABLE 17

| Example | Type of TiCl₃ (l) | Yield of Solid Polymer (g/mM TiCl₃) (c) |
|---|---|---|
| 156 | 152 | 19.8 |
| 157 | 153 | 31.4 |

Notes to Table 17
(c) is as defined in the notes to Table 2.
(l) is as defined in the notes to Table 13.

EXAMPLE 158

Into a stainless steel mill of 15.2 cm in length and 7.9 cm in diameter, and fitted internally with four metal strips, were introduced 200 stainless steel balls of 12.7 mm diameter and 200 stainless steel balls of 6.35 mm diameter. The mill was sealed, evacuated to 0.2 mm of mercury, and purged with nitrogen, the evacuation and purging being carried out a total of six times to give a nitrogen atmosphere in the mill. 4.4 g of diphenylsulphone (equivalent to 17% molar relative to the TiCl₃ content of the Stauffer-AA subsequently introduced) was added to the mill which was evacuated and purged once more. 22.9 g of titanium trichloride (Stauffer-AA) were introduced as a solid into the mill, followed immediately by 102 ml of sulphur-free, sodium-dried toluene. The mill was vigorously shaken and 1.1 ml of titanium tetrachloride (equivalent to 8.6% molar relative to the TiCl₃ content of the Stauffer-AA) were added. The toluene and titanium tetrachloride were both introduced into the mill using syringes. When all the additives had been introduced into the mill it was rotated at 120 rpm for 16 hours. Water at 18° C. was run continuously over the exterior of the mill.

After milling for 16 hours, rotation of the mill was stopped and the mill was evacuated to 1 mm pressure. After half an hour, when 95% of the toluene had been recovered, the mill was pressurised with nitrogen, placed in water at about 50° C. and evacuated once more.

After ¼ hour, the mill was once again pressurised with nitrogen and evacuated and after a further ¼ hour the mill was pressurised with nitrogen finally. Whilst immersed in the water, the temperature of the mill rose to 42° C.

The mill was then cooled to about 15° C., sealed and rotated at 120 rpm for a further 20 hours whilst running water at 15° C. continuously over the exterior of the mill.

The ground product was suspended in 100 ml of an inert aliphatic hydrocarbon having a boiling point in the range 170° to 180° C., milled for 5 minutes and readily removed from the mill. The mill was then washed with two further 100 ml portions of the hydrocarbon diluent.

EXAMPLE 159

The product of Example 158 was used to polymerise propylene using the procedure of Examples 82 to 84. The yield of solid polymer obtained was 36.3 g/millimole of TiCl₃ present in the catalyst system. The proportion of diluent soluble polymer was 0.9% by weight of the total polymer (solid+soluble) formed.

I claim:

1. In a process of treating a transition metal compound in which a solid compound of a transition metal of Groups IVA to VIA of the Periodic Table is subjected to a grinding process in the presence of at least one sulphur-containing organic compound, the improvement which comprises effecting the grinding process in the presence of at least one sulphur-containing organic compound which is a sulphide compound of the formula

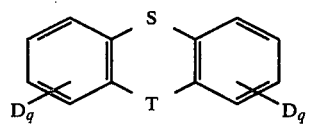

where
D or each D, is, independently, a halogen atom, an alkyl, aryl, alkoxy, aryloxy, alkylthio or arylthio group, or a group —NRR′;
T is —S—, —O—, or —CO—;
R is a hydrogen atom or a hydrocarbyl group;
R′ is a hydrocarbyl group; and
each q is, independently, an integer from 0 up to 4.

2. The process of claim 1 wherein the sulphur-containing organic compound is a sulphide which is selected from phenoxathiin and thianthrene.

3. The process of claim 1 wherein the grinding is effected using a molar excess of the solid compound of a transition metal relative to the organo-sulphur compound.

4. The process of claim 1 wherein the solid compound of a transition metal is ground with from 5 up to 100% molar relative to the solid compound of a transition metal, of at least one organo-sulphur compound.

5. The process of claim 1 wherein the grinding is effected in the presence of a Lewis Acid compound which is different from the solid compound of a transition metal.

6. The process of claim 5 wherein the amount of the Lewis Acid compound is in the range from 1 up to 50% molar relative to the amount of the solid compound of a transition metal.

7. The process of claim 1 wherein the grinding is effected in the presence of an oxidising agent which is oxygen gas, chlorine gas, carbon tetrachloride, hexachlorocyclopentadiene, stannic chloride, phosphorus pentachloride or iodine.

8. The process of claim 7 wherein the amount of the oxidising agent is in the range from 0.2 up to 50% molar relative to the amount of the solid compound of a transition metal.

9. The process of claim 1 wherein the grinding is effected using a rotating ball mill and the major proportion of the grinding is effected in the absence of added solvents or suspending agents and, as a final step, an inert organic liquid is added to the mixture being ground and grinding is continued for a period of not more than 30 minutes.

10. The process of claim 1 wherein the grinding is effected using a grinding acceleration in the range from 12 up to 200 m/s².

11. The process of claim 10 wherein the grinding is effected in a vibrating ball mill and the ground product is removed from the vibrating ball mill by passing a slow current of an inert gas through the mill whilst it is still vibrating.

12. The process of claim 1 which includes an additional step wherein, subsequent to the grinding process, the ground material is heated to a temperature in the range from 60° C. up to 200° C.

13. The process of claim 1 wherein at least a part of the sulphur-containing organic compound is added continuously or intermittently during at least part of the grinding.

14. The process of claim 13 wherein up to 50% of the sulphur-containing organic compound is present from the start of the grinding.

15. The process of claim 13 wherein all of the sulphur-containing organic compound is added before 95% of the grinding time has elapsed.

16. The process of claim 1 wherein at least one stage of the grinding is effected at a temperature below 0° C. and at least another stage of the grinding is effected at a temperature above 0° C., the maximum temperature of grinding being at least 10° C. higher than the minimum temperature of grinding.

17. The process of claim 16 wherein grinding is started at the temperature below 0° C., the temperature is raised, or allowed to rise, whereby grinding is subsequently effected at a temperature above 0° C., and then a further grinding stage at a temperature below 0° C. is effected.

18. The process of claim 1 wherein the transition metal compound is associated with aluminium chloride, grinding with the sulphur-containing organic compound is effected in the presence of an inert liquid which is a solvent for aluminium chloride or a complex of aluminium chloride and the sulphur-containing organic compound, the inert liquid is removed and grinding is continued in the absence of the inert liquid.

19. The process of claim 18 wherein the transition metal compound has the formula $TiCl_3.yAlCl_3$, where y has a value from 0.05 up to 1.00, and the inert liquid is benzene, toluene, xylene or chlorobenzene.

20. The process of claim 1 wherein the grinding of said solid compound is effected in the presence of $TiCl_4$ and the at least one sulphur-containing organic compound.

21. The process of claim 1 wherein a mixture of a solid compound of a transition metal which is a titanium trichloride composition, at least one sulphur-containing organic compound and a Lewis Acid compound which is different from, and additional to, the solid compound of a transition metal and which is aluminum chloride or titanium tetrachloride is subjected to grinding.

22. An olefine polymerisation catalyst comprising (1) a transition metal compound which is the product of the process of claim 1; and (2) at least one organo-metallic compound of aluminium, or of a non-transition metal of Group IIA of the Periodic Table, or a complex of an organo-metallic compound of a non-transition metal of Group IA or IIA of the Periodic Table and an organo-aluminium compound.

23. The catalyst of claim 22 which includes a further component (3) which is at least one organo-Lewis Base compound.

24. The catalyst of claim 22 which includes a further component (4) which is 3-methylheptatriene(1,4,6), cyclooctatreiene, cyclooctatetraene, cycloheptatriene, alkyl- or alkoxy-substituted derivatives thereof, tropylium salts, tropylene complexes, tropolone or tropone.

25. The catalyst of claim 22 wherein for each molecular proportion of the solid compound of a transition metal which is present as component (1)(A), there is present at least 0.05 molecular proportions of component (2).

26. The catalyst of claim 25 wherein there is present up to 50 molecular proportions of component (2).

27. The catalyst of claim 23 wherein for each molecular proportion of the solid compound of a transition metal which is present as component (1)(A), there is present from 0.01 up to 10 molecular proportions of component (3) and the amount of component (3) is less than the amount of component (2).

28. The catalyst of claim 24 wherein for each molecular proportion of component (2) there is present from 0.01 up to 1.0 molecular proportions of component (4).

29. The catalyst of claim 23 wherein component (3) is hexamethylphosphoric triamide; 2-dimethylamino-1,3-dimethyl-1,3,2-diazaphospholidine-2-oxide; N,N,N',N',N''-pentamethyl-N''-β-dimethylaminoethyl phosphoric triamide; tetramethylethylenediamine or tributylamine.

30. In a process for the production of a polymer or copolymer of an olefine monomer wherein at least one olefine monomer is contacted with a polymerisation catalyst the improvement which comprises contacting the at least one olefine monomer with the catalyst of claim 22.

31. The process of claim 30 wherein propylene is polymerised to give a polymer having a flexural modulus of at least 1.00 $GN/m^2$ and polymerisation is continued until the polymer contains not more than 100 parts per million by weight of transition metal derived from the residual catalyst in the polymer.

32. A process of treating a transition metal compound which comprises grinding a titanium trichloride composition in the presence of (1) phenoxathiin; and (2) titanium tetrachloride.

* * * * *